(12) United States Patent  
Glazowski

(10) Patent No.: US 9,007,582 B2
(45) Date of Patent: Apr. 14, 2015

(54) APPARATUS AND METHOD FOR SUPPRESSION OF BACKGROUND NOISE IN MICROSCOPY IMAGING

(71) Applicant: University of Rochester, Rochester, NY (US)

(72) Inventor: Christopher Glazowski, San Francisco, CA (US)

(73) Assignee: University of Rochester, Rochester, NY (US)

( * ) Notice: Subject to any disclaimer, the term of this patent is extended or adjusted under 35 U.S.C. 154(b) by 0 days.

(21) Appl. No.: 14/215,521

(22) Filed: Mar. 17, 2014

(65) Prior Publication Data

US 2014/0268147 A1   Sep. 18, 2014

Related U.S. Application Data

(60) Provisional application No. 61/792,663, filed on Mar. 15, 2013.

(51) Int. Cl.
*G01J 4/00* (2006.01)
*G02B 21/00* (2006.01)

(52) U.S. Cl.
CPC .......... *G02B 21/008* (2013.01); *G02B 21/0032* (2013.01)

(58) Field of Classification Search
CPC ........................................................ G01J 4/00
USPC ......................................................... 356/364
See application file for complete search history.

(56) References Cited

U.S. PATENT DOCUMENTS 6,108,127 A * 8/2000 Atkinson ...................... 359/389
6,577,394 B1   6/2003 Zavislan
6,710,875 B1   3/2004 Zavislan

* cited by examiner

*Primary Examiner* — Roy M Punnoose
(74) *Attorney, Agent, or Firm* — Hodgson Russ LLP

(57) ABSTRACT

An apparatus and method for imaging a section of a medium is disclosed. The apparatus or method receives and returns light from the section and from sites adjacent to the section. A microscope using this apparatus or method can be telecentric in pinhole space at the detection end of the system.

12 Claims, 10 Drawing Sheets

APPARATUS AND METHOD FOR SUPPRESSION OF BACKGROUND NOISE IN MICROSCOPY IMAGING

CROSS-REFERENCE TO RELATED APPLICATIONS

This application claims priority to the provisional patent application entitled "Apparatus and Method for Suppression of Background Noise in Microscopy Imaging," filed Mar. 15, 2013 and assigned U.S. App. No. 61/792,663, the disclosure of which is hereby incorporated by reference.

STATEMENT REGARDING FEDERALLY SPONSORED RESEARCH

This invention was made with government support under contract numbers 5R42CA110226 and 5T32AR007472 awarded by the National Institutes of Health. The government has certain rights in the invention.

FIELD OF THE INVENTION

The present invention relates to imaging systems which enhance the quality of images of regions of interest in turbid media by reducing noise caused by, for example, the turbidity.

BACKGROUND OF THE INVENTION

Confocal microscopy is a well-established technology with sub-micrometer lateral (perpendicular to the optical axis) and micrometer longitudinal (parallel to the optical axis) resolution. In a typical biomedical setting, this provides optical images of sections of tissue for qualitative and quantitative cellular morphology, pathology, and chemical analysis. The contrast and resolution of these images allows them to be compared to the gold standard of histopathological preparation and viewing of sectioned and stained tissue.

The use of Nomarski techniques applied to confocal microscopy, and especially laser scanning confocal microscopy, is known to enhance the contrast of objects with phase variations or surface profile variations. Such differential interference contrast ("DIC") microscopes split a uniform, linearly-polarized or circularly-polarized illuminated pupil such that two point spread functions form at the focus of the objective. This is accomplished using a birefringent prism, such as a Nomarski or Wollaston prism, placed at the pupil (or conjugate location to the pupil) of the microscope. The prism shears the input beam, assumed to have polarization components both parallel and perpendicular to the Nomarski axis, into two beams and the orthogonally linearly-polarized pupils of the objective are focused to form two telecentric (in the object space) polarized spots. Upon reflection from the object, the sheared linearly-polarized beams are collected by the objective and re-combined at the pupil. Passing the recombined beam through a polarizing element provides an interference image, which is based on the phase profile of the scanned sample.

Such DIC configurations were previously improved by circularly-polarizing the sheared beams in order to further enhance the resulting image by reducing interference from turbidity above and below the section being imaged. See, for example, U.S. Pat. No. 6,577,394 to Zavislan, titled "Imaging System Using Polarization Effects to Enhance Image Quality." FIG. 1 of the Zavislan patent depicts a prior art configuration of the polarization optics and objective of a microscope using a birefringement prism to shear a linearly-polarized beam into two linearly-polarized beams (having polarization orthogonal to each other) and a quarter wave plate retarder to circularly polarize the beams (opposite-handed polarization states).

By illuminating the sample with sheared beams having generally circular polarization in opposite senses (left and right handed circular polarization), images obtained using light returned from the image plane (i.e., a section within the sample), which may be altered by the sample's circular dichroism, retardation, etc., have reduced image distortion, such as that caused by scattering sites adjacent to the image plane or section.

Although prior techniques have improved the quality of images produced using microscopy, including confocal microscopy, there is a need for improved image quality by further reduction of noise caused by, for example, the turbidity of the medium.

BRIEF SUMMARY OF THE INVENTION

While previous efforts toward improving image quality have been focused on changing the characteristics of the light incident on the medium, the present invention provides improvements in image quality by configuring the microscope to be telecentric in pinhole space at the detection end of the system. Accordingly, it is a goal of the present invention to provide improved imaging systems, such as, for example, imaging systems using confocal microscopy, laser scanning confocal microscopy, scanning reflectance confocal microscopy, etc.

DESCRIPTION OF THE DRAWINGS

For a fuller understanding of the nature and objects of the invention, reference should be made to the following detailed description taken in conjunction with the accompanying drawings, in which.

DETAILED DESCRIPTION OF THE INVENTION

Figure 2:
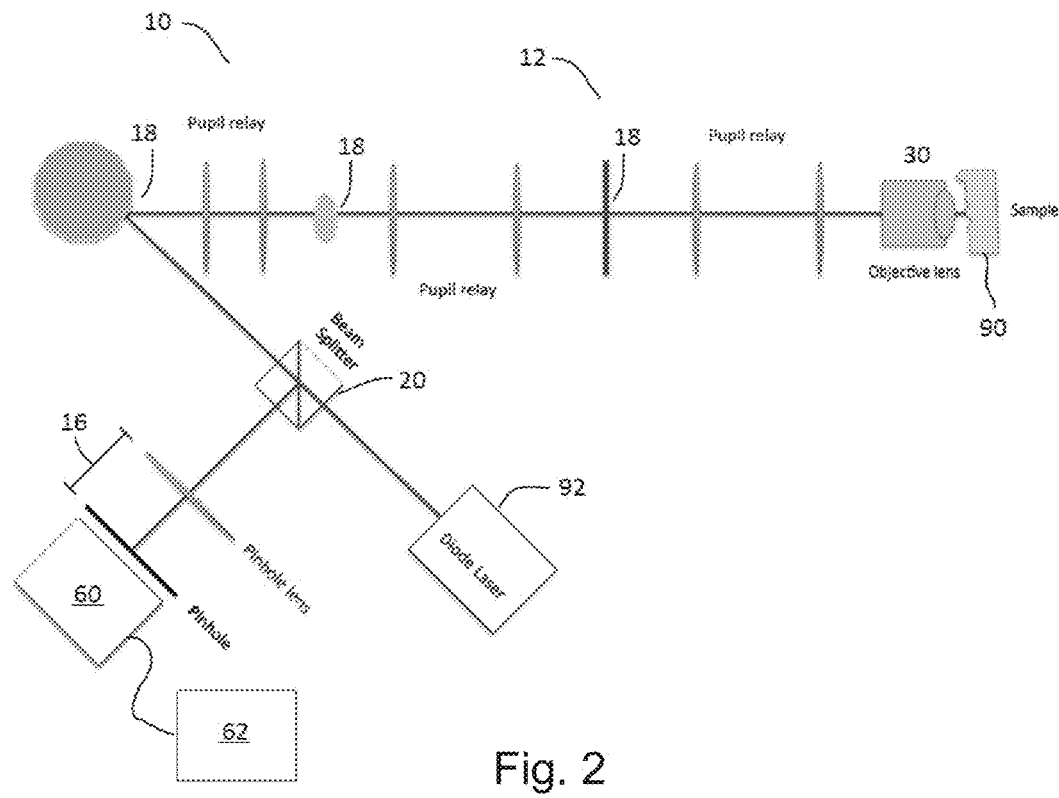
FIG. 2 is a diagram depicting the illumination pathway and detection pathway for an SRCM.

The present invention may be embodied as an apparatus 10 for imaging a sample of a medium 90, which may be a turbid sample. The turbid sample can be a section of dermatological tissue. The apparatus 10 may be, for example, a scanning reflectance confocal microscope ("SRCM"), such as that depicted in FIG. 2. In such an apparatus 10, light is received at the medium and illuminates a section of the medium 90. Reflected light is returned from the section and from sites adjacent to the section. The apparatus 10 comprises an optical system 12 for directing light to the medium 90 ("received light") and directing light from the medium 90 ("returned light"). In some embodiments, the light directed to the medium 90 may be laser light provided by a single spatial mode laser 92.

The section being imaged, especially in imaging of biological tissue, may be of the thickness of a cell, for example about five microns. Thick biological tissue is a volume object. Information exists at various depths, dimensions and spatial frequencies. As an optically dense material, it scatters most of the incident light throughout its depths. SRCMs optically section thick tissues by preferentially collecting scattered light from a selected depth to form an image that maps the physical structure of the tissue at that location.

The section (i.e., image plane, focal plane, focal region) may be at a surface of the specimen 90 or embedded in the specimen 90. Light is also multiply scattered from regions away from the nominal focus, but due to the redirecting nature of the scattering events, may be collected by the objective lens and directed through a detection pathway of the apparatus 10. This multiply-scattered light acts like a secondary source of illumination (referred to herein as the background phase plate ("BPP"), which can manifest itself as speckle in the image or interfere with the light collected from the image plane and thus distort the appearance of the image. Noise due to scattering sites away from the focal region may occur whether the region is at the surface or embedded in the specimen.

Figure 1:
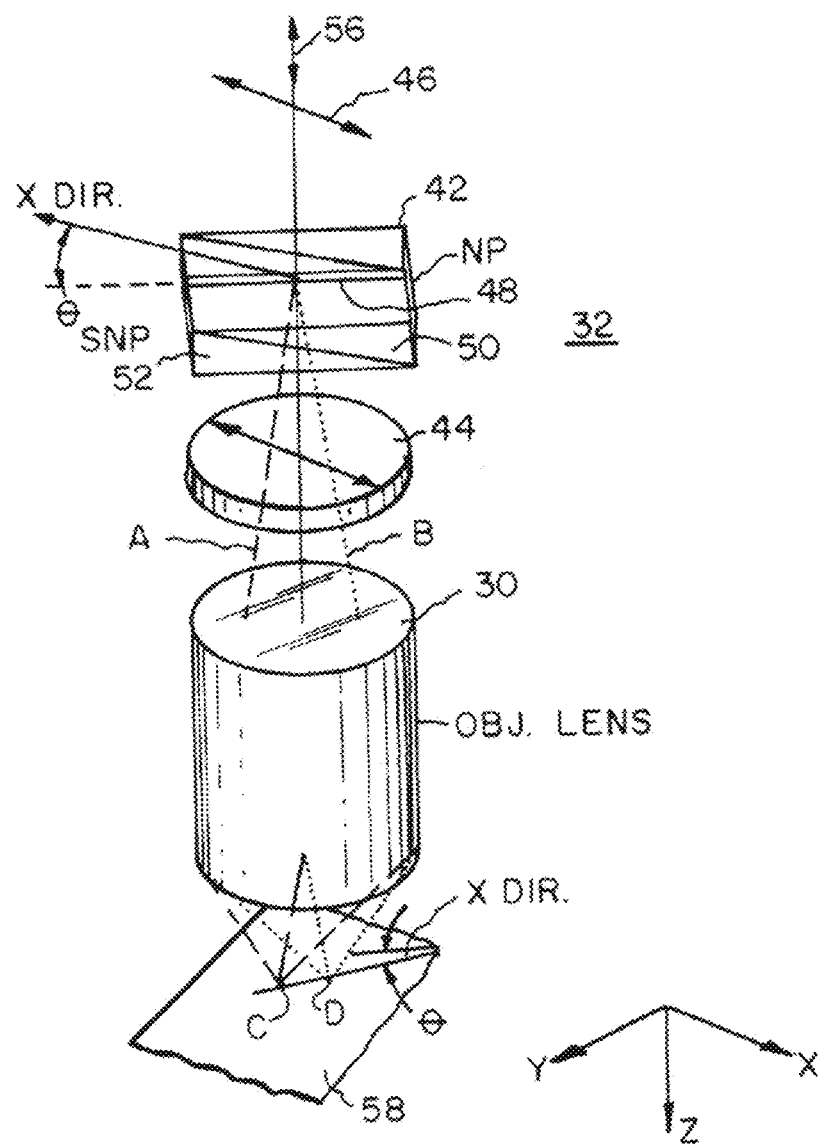
FIG. 1 is a diagram showing the optics of a scanning reflectance confocal microscope ("SRCM") according to an embodiment of the present invention.

The optical system 12 is configured to shear illuminating beam provided by the laser 92 into two beams of differing polarization as is known in the art. For example, in some embodiments, the light from the laser 92 is linearly-polarized and passes through polarization processing optics 32. Referring back to the exemplary prior art embodiment depicted in FIG. 1, the polarization processing optics 32 may comprise a prism 42, such as a Wollaston or Nomarski prism. The polarization 46 of the incident beam 56 contains components of polarization parallel to both optical axes of the prism sections 50, 52, and the prism 42 splits or shears the incident beam 56 into two linearly-polarized beams A, B. The axes of polarization for the two beams A, B are parallel to each of the optical axes of the two sections 50, 52 of the prism 42. Both beams A, B pass through a quarter wave phase retarder 44. The quarter-wave plate 44 causes the beams A, B to be, for example, circularly polarized in opposite senses (opposite-handed). The prism 42 is preferably placed in either the aperture stop of the optical system or at an image of the aperture stop of the optical system. Typically, the aperture stop of a scanning confocal microscope is located at the aperture stop of the objective lens 30. Therefore the prism 42 may be placed at the aperture stop of the objective or at an image of the aperture stop. Placing the prism 42 and quarter-wave phase retarder 44 at positions away from the aperture stop still provides noise reduction, but the noise reduction is reduced and may vary over the field of view. Reduction of background noise can still be accomplished with the shearing prism placed away from the aperture stop or an image of the aperture stop by equivalent techniques in keeping with the present disclosure.

The beams A, B are directed through an objective 30 and are focused in the medium 90 at spots C, D which are spaced from each other in the focal plane (in the image section of interest) and/or along the optical axis (not shown). The beams A, B generally overlap outside of the focal region such that both beams illuminate the noise-producing scatterers outside (above and below) the focal region. Distortion is reduced by the interference of the light returned from the scattering sites outside of the focal region. However, circular dichroism, optical retardance, and other optical activity also exists between the light returned from the spots C, D.

Figure 3A:
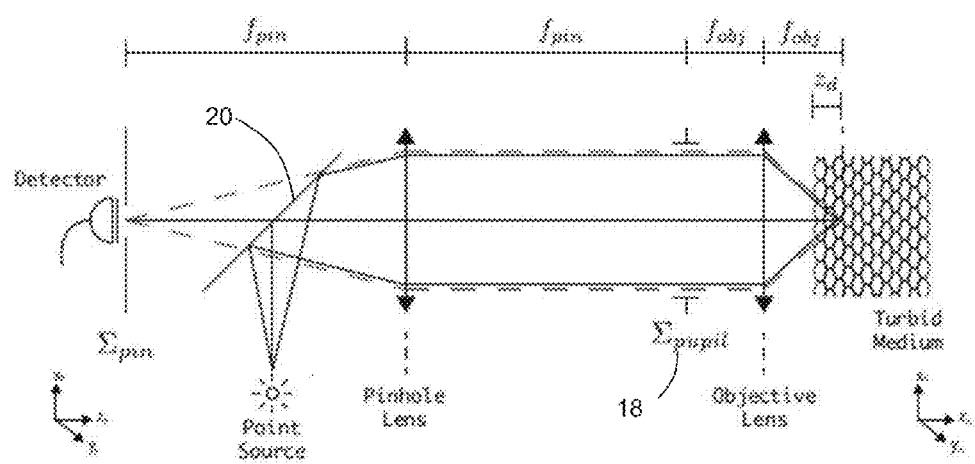
FIG. 3A is a diagram depicting the pathways of an SRCM having a pinhole assembly configured according to an embodiment of the present invention.
Figure 3B:
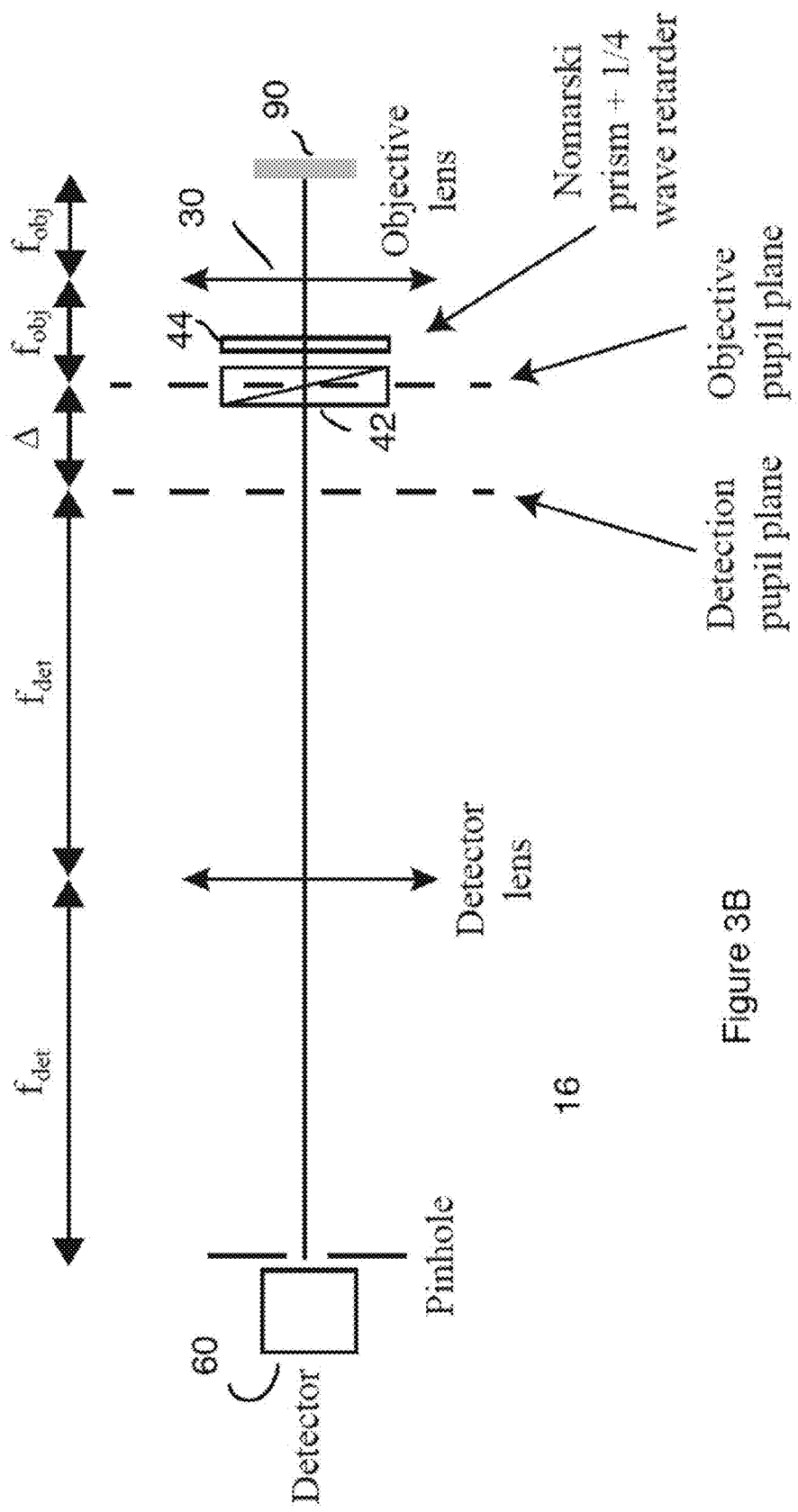
FIG. 3B is a diagram depicting exemplary focal lengths of an SRCM.
Figure 4A:
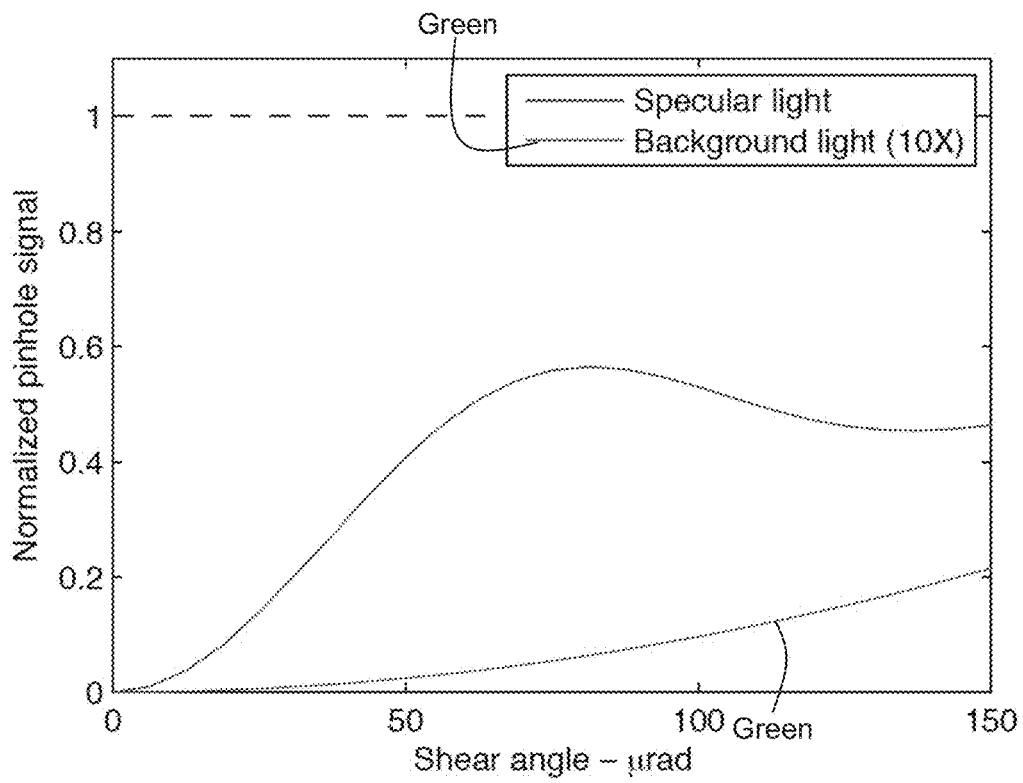
FIG. 4A is a graph showing the specular and background contributions to the pinhole signal relative to $TEM_{00}$ for a telecentric optimized SRCM operating at 0.9NA (numerical-aperture) with a 100 μm pinhole (background line is multiplied by 10× for visualization)
Figure 4B:
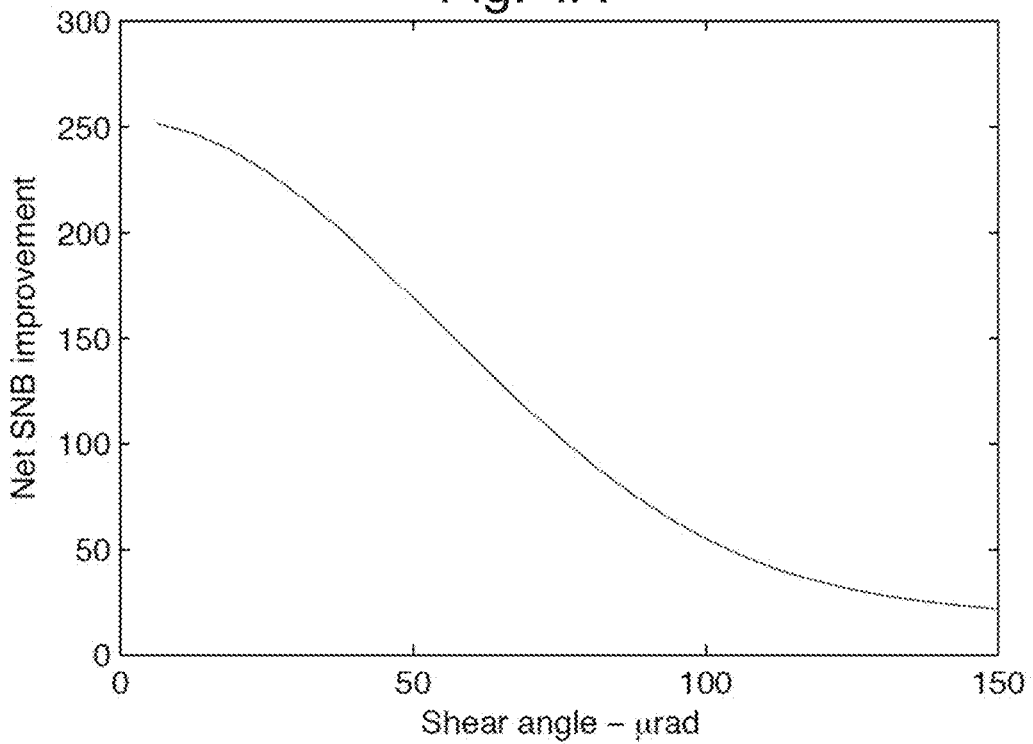
FIG. 4B is a graph showing the net signal-to-background ("SBR") improvement versus shear angle of the prism of the embodiment used to produce FIG. 4A.
Figure 5A:
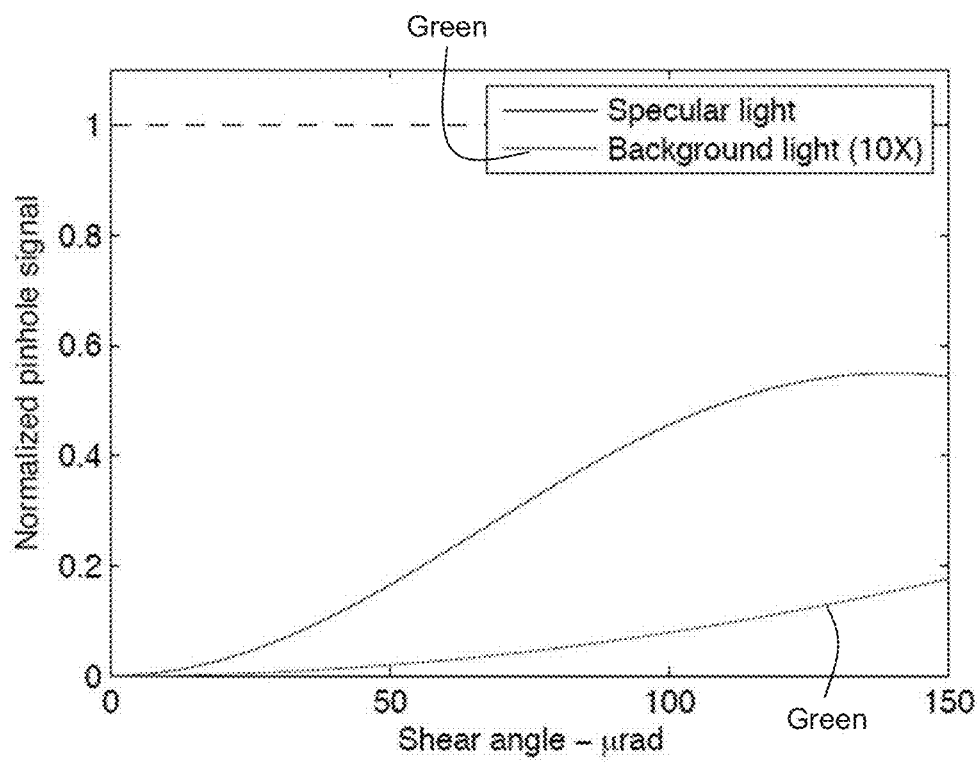
FIG. 5A is a graph showing the specular and background contributions to the pinhole signal relative to $TEM_{00}$ for a telecentric optimized SRCM operating at 0.5NA with a 100 μm pinhole (background line is multiplied by 10× for visualization)
Figure 5B:
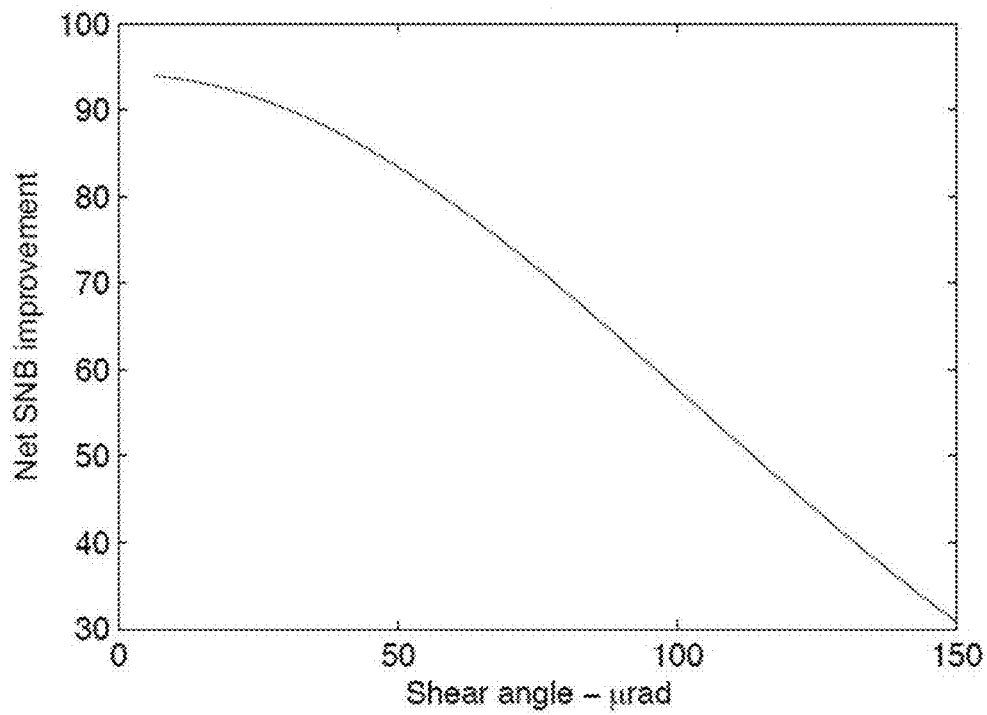
FIG. 5B is a graph showing the net SBR improvement versus shear angle of the prism of the embodiment used to produce FIG. 5A (net signal-to-background improvement versus shear)

The light is returned from the medium 90 and collected by the objective 30. The optical system 12 of an apparatus 10 of the present invention further comprises a pinhole lens assembly 16 configured to receive the returned light. The pinhole lens assembly 16 is located after a beamsplitter 20 such that returned light is directed to the pinhole assembly 16. The pinhole lens assembly 16 has a focal length $f_{pin}$ (see FIG. 3A). The focal length $f_{pin}$ is configured such that a first focal point of the pinhole lens assembly 16 is located at a pupil 18 of the optical system 12. In this way, the pinhole assembly 16 is telecentric—i.e., the apparatus 10 is telecentric in pinhole space. Telecentricity in the pinhole space advantageously reduces noise as described below in the Discussion section.

The apparatus 10 comprises a detector 60 configured to receive the returned light from the pinhole lens assembly 16. The detector 60 produces an electrical signal in response to the light received by the detector 60 from the pinhole assembly 16. The detector 60 may be, for example, a photo diode. The electrical signal of the detector 60 varies according to characteristics of the light received at the detector 60. The amplitude of the electrical signal may be considered to be generally proportional to the reflectance of the section. In some embodiments, the electrical signal may vary according to a polarization parameter of the received light, such as, for example, circular dichroism, optical activity, degree of rotation of the polarization, or other characteristics.

The apparatus may further comprise a processor 62 in communication with the detector 60. The processor 62 is programmed to generate an image of the section based on the electrical signal of the detector 60. The medium 90 can be scanned by the apparatus in any manner. In the exemplary embodiment depicted in FIG. 2, a rotating polygon is provided for x-axis scanning and a galvanometric mirror is used for y-axis scanning. Other configurations, using, for example, undulating mirrors, pivoting mirrors, object scanning translation or rotation stages or otherwise can be used. These scanning optics generally provide scanning in the X and Y directions, where X and Y are coordinates orthogonal to each other in the image plane. The scanning optics are controlled by a controller, which may be processor 62 or a controller separate from processor 62. In some embodiments, the medium 90 is scanned by moving the objective lens using actuators, or moving the tissue relative to the objective by translation or rotation stages. Scanning may also be performed in the Z direction. It will be appreciated that spots C, D can be scanned in X, Y, and Z over the image plane in order to provide optical signals from which the image can be constructed by the processor 62 after detection by the detector 60. Processor 62 may have the ability to display, store, and transmit images.

Figure 7:
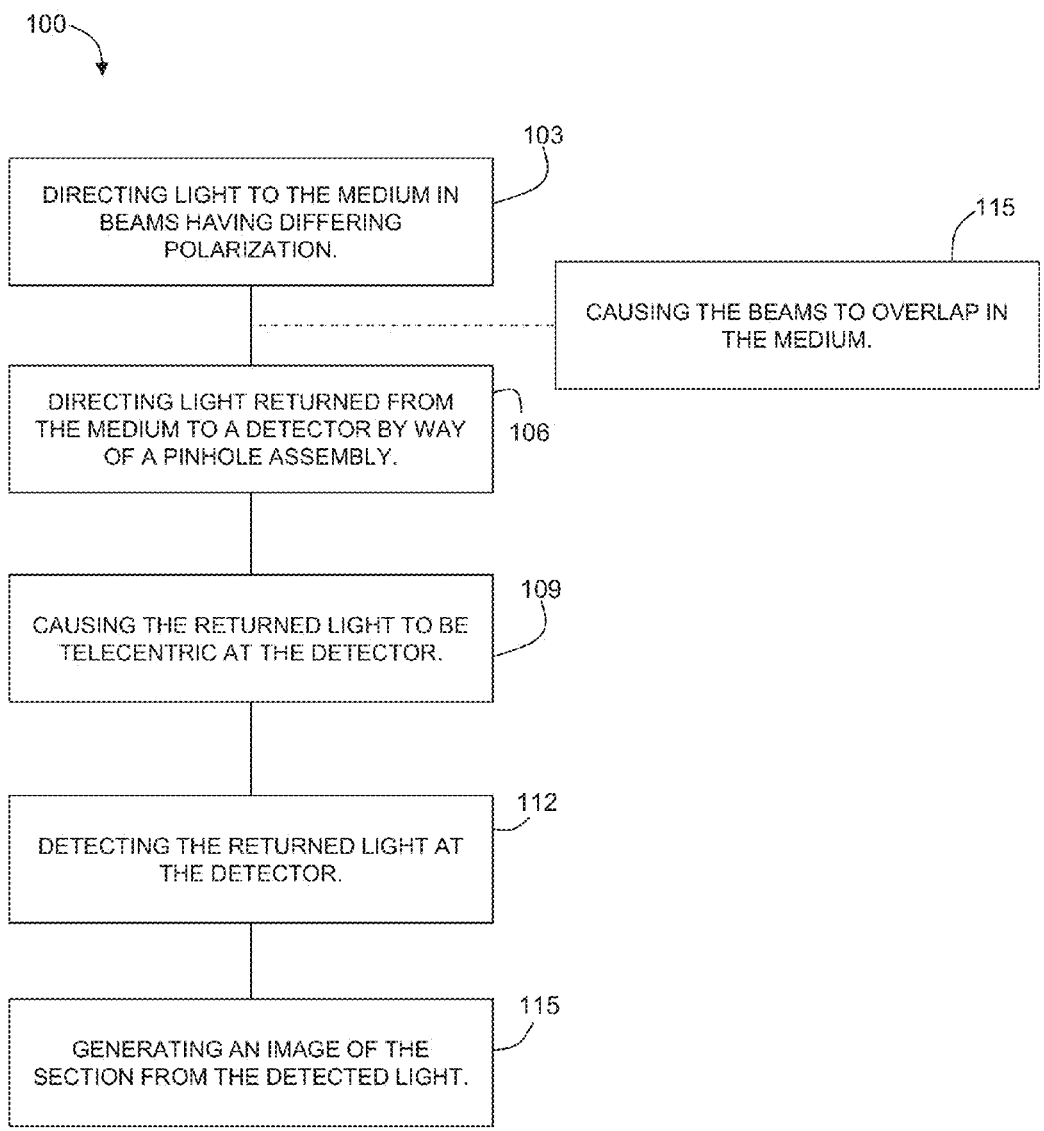
FIG. 7 is a flowchart showing a method according to another embodiment of the present invention.

The present invention may also be embodied as a method 100 of imaging a section of a medium (see FIG. 7). As above, the medium may be turbid, and may receive light and return light from the section and from sites adjacent to the section. The method 100 comprises the step of directing 103 light in beams of different polarization to the medium along an optical axis. The directed 103 beams may be polarized in any way, including, for example, shearing a single linearly-polarized beam using a birefringent prism and using a quarter wave plate retarder to cause each sheared beam to have opposite circular polarizations. The beams may be caused 118 to overlap in the medium to reduce the portion of the light returned from the sites adjacent to the section and spaced generally along the optical axis. The beams may be directed 103 such that the beams are incident in the medium at spots spaced from each other along the optical axis. The beams may be directed 103 such that the beams are incident in the medium at spots spaced laterally from each other in a focal plane.

The light incident on the medium is returned by the section (at an image plane) and also from sites adjacent to the section. The light returned from the medium is directed 106 to a detector by way of a pinhole assembly. The direction 106 may be provided by, for example, an optical assembly as described above. The method 100 comprises the step of causing 109 the returned light received at the detector to be substantially telecentric—i.e., the chief rays for light scattered outside the section are collimated and parallel to the optical axis in the space between the pinhole lens and pinhole.

The returned light directed 106 to the detector is detected 112. An image of the section is generated 115 from the detected 112 returned light. The generated 115 image corresponds to a refractive index distribution within the section that may be modified by polarization parameter of the returned light. The polarization parameter may be any characteristic of interest to the operator. For example, in some embodiments, the polarization parameter may be the degree of rotation of the polarization of the returned light. The polarization parameter may be a function of the differential circular dichroism or optical activity of the returned light.

While system 10 is shown using a single wavelength laser 92, it is known in the art to make multi-wavelength laser scanning confocal microscopes. In this case, the two or more laser beams of different wavelengths can be angularly aligned within the diffraction limited divergence and with substantial spatial overlap. In this way, the object can be imaged with two or more colors either simultaneously or sequentially. For multi-wavelength confocal microscopes, the optical components may be designed for the wavelength range used. Additionally, more than one pinhole and detector assembly may be required to cover the wavelength range used. If more than one pinhole and detector assembly is needed, dichroic beamsplitters may be placed between the beam splitter 20 and the pinhole to direct the beams selected based on wavelength to the detectors with sensitivity at the selected wavelength.

Discussion

The following discussion shows, mathematically, the mechanism by which background suppression is improved. An exemplary embodiment of DIC, called non-reversible DIC ("NR-DIC"), is used here to illustrate the improvements. In NR-DIC, the orthogonally-polarized beams of light returned from the medium are re-sheared in the prism rather than being combined. This embodiment is not intended to be limiting.

Some methods of DIC offer enhanced background suppression since imbalances in the optical path between the illumination modes in object space are partially compensated by propagation through the prism to the pinhole. In embodiments of the present invention, compensation is increased by optimizing the optical path of the returned light from the prism to the pinhole. As stated above, the prisms of previous microscopes are typically placed in one of the pupils of the optical system such that the modes are telecentric in object space. An apparatus according to the present invention, being telecentric in pinhole space, allows significant improvements in background suppression by better matching the optical paths of a polarization preserving background dipole, thereby compensating for the driving phase imbalance. This phase-matching condition occurs for a pinhole telecentric to the relayed pupils of the SRCM.

Figure 8:
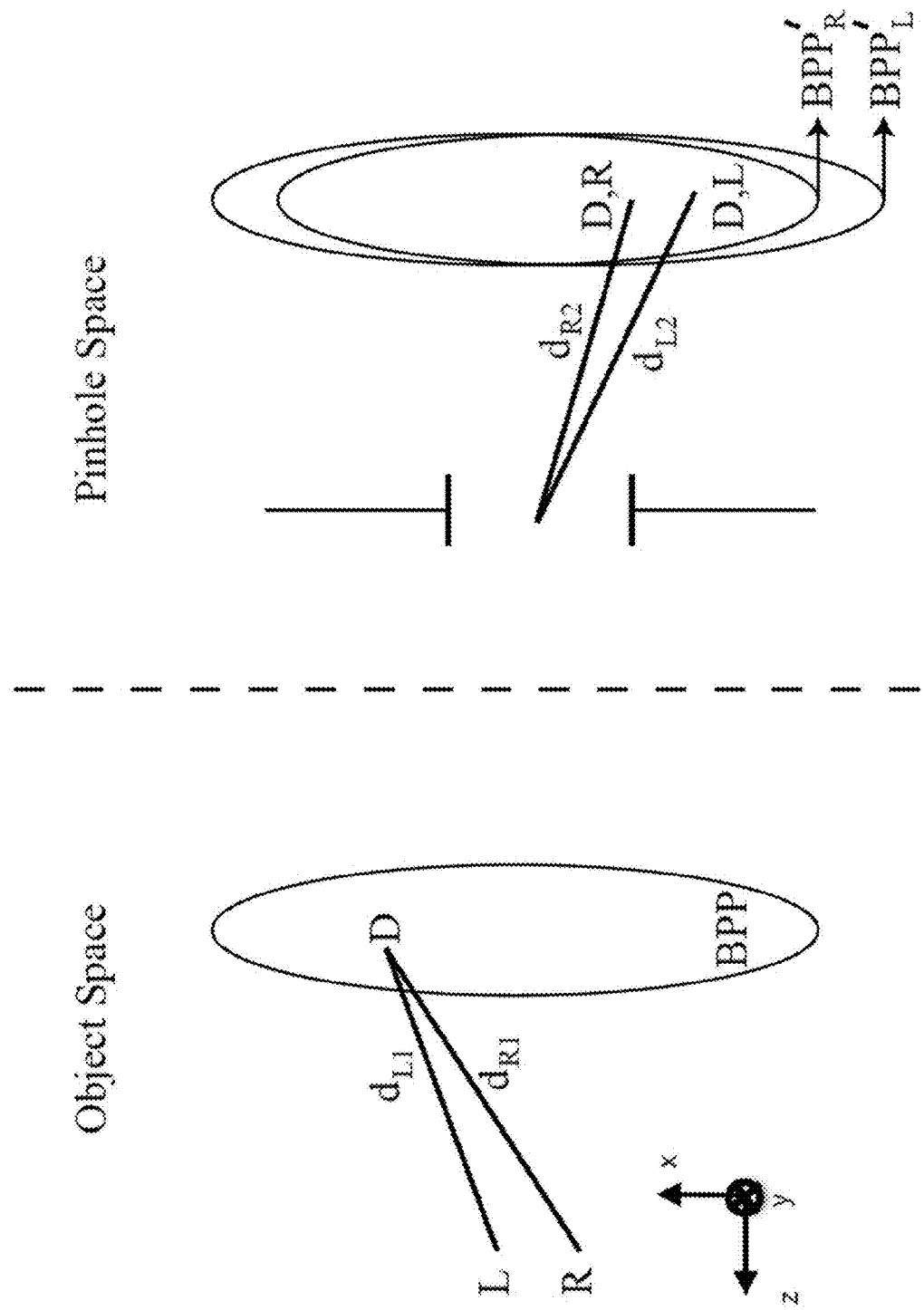
FIG. 8 is a diagram illustrating the optical path length relationships of a light scatterer in object space positioned away from the section and image of the light scattering in pinhole space.

The pinhole collects light from the focal region at the section and from light scattered outside the section. The light scattered outside the section may be additionally scattered until it reaches the surface of the tissue. Thus, the surface of the tissue appears to be secondary source of light that is geometrically imaged to a conjugate point beyond the pinhole. Mathematically, the background light can be modeled as the sum of scattered light from a collection of scatterers located at the surface of the tissue illuminated by the sheared modes focused onto the focal plane. FIG. 8 illustrates the optical path relationships for each equivalent scatterer in the secondary scatterer in object space and the image of the secondary scatterer in image space. This can be illustrated mathematically. The field at a point in the pinhole due to a single point D in the background can be expressed as the sum of dipole fields as viewed through the Nomarski prism:

$$U_B = e^{i\varphi BPP}\left(\frac{\exp[i(k_o d_{L,1} + k_p d_{L,2})]}{d_{L,1} d_{L,2}} - \frac{\exp[i(k_o d_{R,1} + k_p d_{R,2})]}{d_{R,1} d_{R,2}}\right) \quad (1)$$

where the subtraction between the components is a result of a crossed linear analyzer at the pinhole lens in an NR-DIC arrangement. For objects and geometries associated with tissue imaging, the $1/r^2$ amplitude dependence of the denominators will be nearly equal. For there to be good cancellation of a background dipole, it would be advantageous to meet the condition:

$$\exp[i(k_o d_{L,1} + k_p d_{L,2})] - \exp[i(k_o d_{R,1} + k_p d_{R,2})] \quad (2)$$

It follows that this leads to the condition of matching the optical paths:

$$(n_o d_{L,1} + n_p d_{L,2}) = (n_o d_{R,1} + n_p d_{R,2}) \quad (3)$$

or equivalently:

$$(n_o d_{L,1} + n_o d_{R,1}) = (n_p d_{R,2} + n_p d_{L,2}) \quad (4)$$

where the distances are:

$$d_{L,1} = \sqrt{(x_b + x_s)^2 + y_b^2 + z_b^2} \quad (5)$$

$$d_{R,1} = \sqrt{(x_b+x_s)^2+y_b^2+z_b^2} \quad (6)$$

$$d_{R,2} = \sqrt{((x'_b+x'_s)-x'_p)^2+(y'_b)^2+(z'_b)^2} \quad (7)$$

$$d_{L,2} = \sqrt{((x'_b-x'_s)-x'_p)^2+(y'_b)^2+(z'_b)^2} \quad (8)$$

where $x_b$, $y_b$, and $z_b$ are the distances of an equivalent dipole scatter D from the intersection of the optical axis of the objective, $x_s$ is one-half the shear separation between the two illumination modes, and $x'_b$, $y'_b$, $z'_b$, and $x'_s$ are the corresponding distances from the center of the pinhole to the conjugate images in pinhole space of the equivalent dipole scatter D.

For simplicity, this discussion is restricted to background points that vary along the x-axis. Because the y-axis terms on both sides are symmetric, they will cancel anyway. The primed, imaged coordinates can be replaced with their magnification relations leaving:

$$d_{L,1} = \sqrt{(x_b+x_s)^2+z_b^2} \quad (9)$$

$$d_{R,1} = \sqrt{(x_b-x_s)^2+z_b^2} \quad (10)$$

$$d_{R,2} = \sqrt{(M_x(x_b+x_s)-x_p)^2+(M_z^2 z_b)^2} \quad (11)$$

$$d_{L,2} = \sqrt{(M_x(x_b-x_s)-x_p)^2+(M_z^2 z_b)^2} \quad (12)$$

where $M_x$ and $M_z^2$ are the lateral and longitudinal magnifications through the SRCM for the background phase plate located at $z_b$ being imaged to $z'_b$. ($M_z$ is defined squared purely for convenience.) The background phase plate is an equivalent illumination source used to model light that is multiply scattered from regions away from the nominal focus (image plane), but due to the redirecting nature of the scattering evens, is collected by the objective lens and focused by the system to the pinhole for detection. These magnifications are functions of $z_b$. The square roots can be written out as binomial expansions, defined as:

$$(1+x)^\alpha = 1 + \alpha x + \frac{\alpha(\alpha-1)}{2}x^2 + \theta(x^3) \quad (13)$$

of which the results are:

$$n_o d_{L,1} = n_o z_b \left[1 + \frac{1}{2}\left(\frac{x_b+x_s}{z_b}\right)^2 - \frac{1}{8}\left(\frac{x_b-x_s}{z_b}\right)^4 + \ldots\right] \quad (14)$$

$$n_o d_{R,1} = n_o z_b \left[1 + \frac{1}{2}\left(\frac{x_b-x_s}{z_b}\right)^2 - \frac{1}{8}\left(\frac{x_b-x_s}{z_b}\right)^4 + \ldots\right] \quad (15)$$

$$n_p d_{R,2} = \quad (16)$$
$$n_p(M_z^2 z_b)\left[1 + \frac{1}{2}\left(\frac{M_x(x_b+x_s)-x_p}{(M_z^2 z_b)}\right)^2 - \frac{1}{8}\left(\frac{M_x(x_b+x_s)}{(M_z^2 z_b)}\right)^4 + \ldots\right]$$

$$n_p d_{L,2} = \quad (17)$$
$$n_p(M_z^2 z_b)\left[1 + \frac{1}{2}\left(\frac{M_x(x_b-x_s)-x_p}{(M_z^2 z_b)}\right)^2 - \frac{1}{8}\left(\frac{M_x(x_b+x_s)}{(M_z^2 z_b)}\right)^4 + \ldots\right]$$

For a telecentric system with an object and pinhole space index-of-refractions $n_o$ and $n_p$, $$M_z^2 = \left(\frac{n_p}{n_o}\right) M_x^2$$

for all $z_b$. Through the second-order terms and replacing the $M_z^2$ factors appropriately, we are left with:

$$n_o d_{L,1} = n_o z_b \left[1 + \frac{1}{2}\left(\frac{x_b+x_s}{z_b}\right)^2 - \ldots\right] \quad (18)$$

$$n_o d_{R,1} = n_o z_b \left[1 + \frac{1}{2}\left(\frac{x_b-x_s}{z_b}\right)^2 - \ldots\right] \quad (19)$$

$$n_p d_{R,2} = n_p\left(\frac{n_p}{n_o} M_x^2 z_b\right)\left[1 + \frac{1}{2}\left(\frac{n_o}{n_p}\right)^2 \frac{1}{M_x^2}\left(\frac{(x_b+x_s)-x_p}{(z_b)}\right)^2 - \ldots\right] \quad (20)$$

$$n_p d_{L,2} = n_p\left(\frac{n_p}{n_o} M_x^2 z_b\right)\left[1 + \frac{1}{2}\left(\frac{n_o}{n_p}\right)^2 \frac{1}{M_x^2}\left(\frac{(x_b+x_s)-x_p}{(z_b)}\right)^2 - \ldots\right] \quad (21)$$

Comparing the terms, it can be seen that Equation 4 is satisfied for the center of the pinhole, $x_p=0$. In essence, strong phase cancellation (perfect through second order) exists for all background dipole locations. As the system moves away from telecentricity, $M_z^2$ will not be equal to $M_x^2$, and the phasors will not be ideally matched. FIGS. 4A, 4B, 5A, and 5B show the background trends versus shear angle of the doubly-telecentric SRCM of the present disclosure.

The shearing prism may be placed in the aperture stop of the objective lens or equivalent pupil plane. For systems where it is not possible to place the shearing prism at this location, the phasors of a background dipole will not cancel in a strict telecentric detector arrangement. However, a local background minimizing solution can be found by spacing the pinhole-lens assembly 16 appropriately according to modified phasor terms. These modified phasor terms account for the geometry of the placement of the shearing prism, and follow similar treatment as presented in Equations 1-21 above.

EXEMPLARY EMBODIMENTS

Figure 6A:
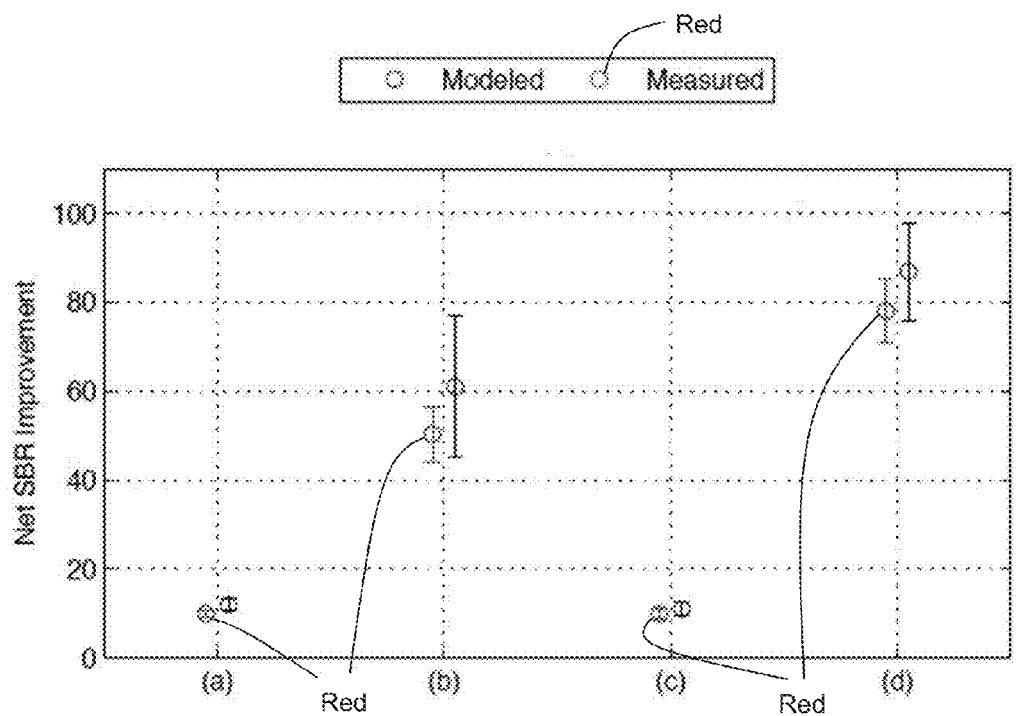
FIG. 6A is a graph comparing the net SBR improvement of SRCMs where the SRCM is configured with: (a) 0.5NA non-telecentric; (b) 0.9NA non-telecentric; (c) 0.5NA telecentric; and (d) 0.9NA.
Figure 6B:
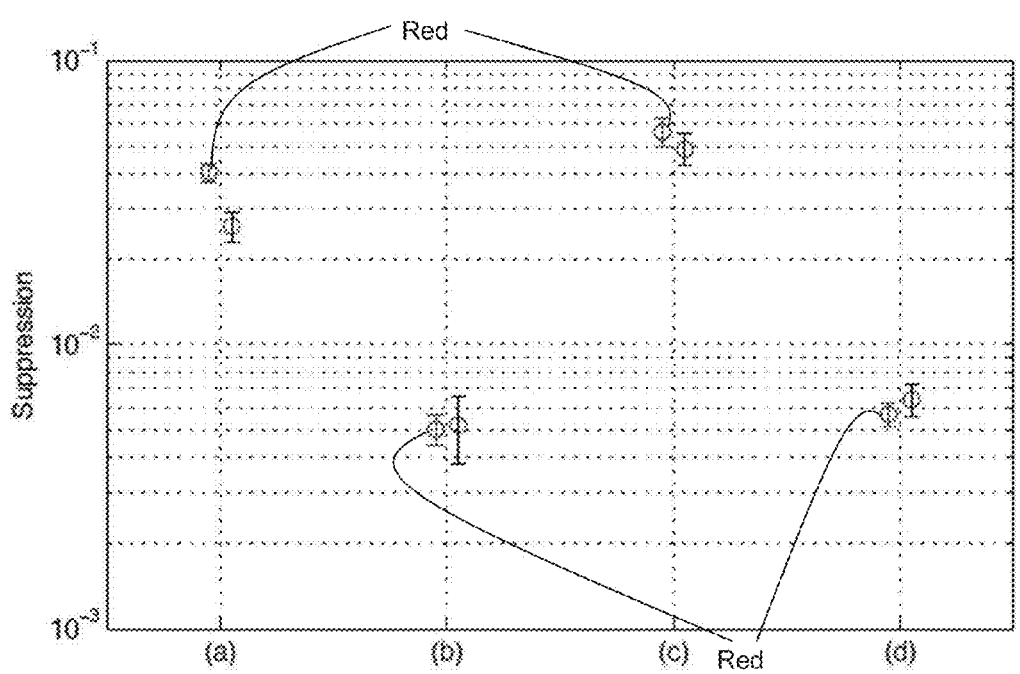
FIG. 6B is a graph comparing the net SBR improvement of SRCMs where the SRCM is configured with: (a) 0.5NA non-telecentric; (b) 0.9NA non-telecentric; (c) 0.5NA telecentric; and (d) 0.9NA.

A commercially-available SRCM was made telecentric in pinhole-space to characterize the noise suppression in microscope according to the present invention. Microscopes are typically designed to be telecentric in object space so that magnification is constant through focus. The exemplary microscope was additionally made telecentric in pinhole space by replacing the stock 80 mm focal length SRCM pinhole-lens by a pin-hole lens having a focal length of 127 mm. An auto-collimator was used to align the lens along the system's optical axis such that the rear focal point of the lens overlapped with the polygon-surrogate mirror—i.e., overlapping the conjugate pupils of the SRCM. The detector voltage for 10 Hz, 100 μm line scans was recorded with an oscilloscope and processed in MATLAB. The exemplary system resulted in a marked increase in background suppression and, as a result, an increase in the realizable signal to background ratio ("SBR") (see FIGS. 6A and 6B). For the 90 μrad prism used in this embodiment, the SBR improved from approximately 10× to 50× and 10× to 80× for 0.5 and 0.9NA (numerical aperture) respectively as compared to TEM$_{00}$ illumination.

It should be noted that the benefit of providing NR-DIC optics along with configuring the detection optics to be telecentric can be applied to optical coherence tomography ("OCT") imaging systems. OCT systems provide images within tissue by collecting the light scattered from the tissue and interfering it with light from a reference arm. Optical coherence tomography systems are known (D. Huang, et al. "Optical coherence tomography, Science vol. 254, pgs. 1178-1181, 1991; J. M. Schmitt, A. R. Knuettel, A. H. Gandjbakhche, R. F. Bonner, "Optical characterization of dense tissues using low-coherence interferometry", SPIE Proceedings, vol. 1889 pgs 197-211, July 1993; *Handbook of Optical Coherence Tomography*, B. Bouma and G. J. Tearney, eds, Markel Dekker, NY (2002) ISBN 0-8247-0558-0; M. Choma, M. Sarunic, C. Yang, and J. Izatt, Sensitivity advantage of swept source and Fourier domain optical coherence tomography, Optics Express, Vol. 11, Issue 18, pp. 2183-2189 (2003), http://dx.doi.org/10.1364/OE.11.002183). OCT systems use time domain, Fourier domain, and swept wavelength source methods to provide interference-based detection as described in Bouma and Tearney (2002) and by Choma et al. (2003). Images can be acquired by (1) mechanically translating the tissue relative to the optical system, (2) mechanically translating the complete optical system or just the objective relative to the tissue, (3) optically scanning the object illumination beam relative to the optical axis of the objective, (4) imaging the object on to a one-dimensional or two-dimensional detector array, or a combination of (1), (2), (3), and/or (4). Systems that optically scan the object illumination beam are sometimes referred to as optical coherence microscopes (H. Wang, J. A. Izatt and M. D. KulKarni, "Optical Coherence Microscopy" chapter 10 (pgs. 275-298) and H Saint-Jalmes, et al. "Full-field optical coherence microscopy" chapter 11, (pgs. 299-334) *Handbook of Optical Coherence Tomography*, B. Bouma and G. J. Tearney, eds, Markel Dekker, NY (2002) ISBN 0-8247-0558-0) and can provide images with lateral resolution comparable to confocal microscopy.

Techniques have been proposed to reduce speckle in OCT systems (J. M. Schmitt, S. H. Xiang, K. M. Yung, "Speckle in Optical Coherence Tomography," Journal of Biomedical Optics 4(1), 95-105 (1999), DOI 10.1117/1.429925 and J. M. Schmitt, S. H. Xiang and K. M. Yung, "Speckle Reduction Techniques, chapter 7 (pgs. 175-201) in *Handbook of Optical Coherence Tomography*, B. Bouma and G. J. Tearney, eds, Markel Dekker, NY (2002) ISBN 0-8247-0558-0) The techniques described in the article by Schmitt et al. (2002) do not disclose the use of NR-DIC optics to reduce speckle. U.S. Pat. No. 6,577,394 to Zavislan discloses the use of NR-DIC optics, but does not disclose or suggest the telecentric configuration of the detection system to optimize the speckle reduction.

Figure 9A:
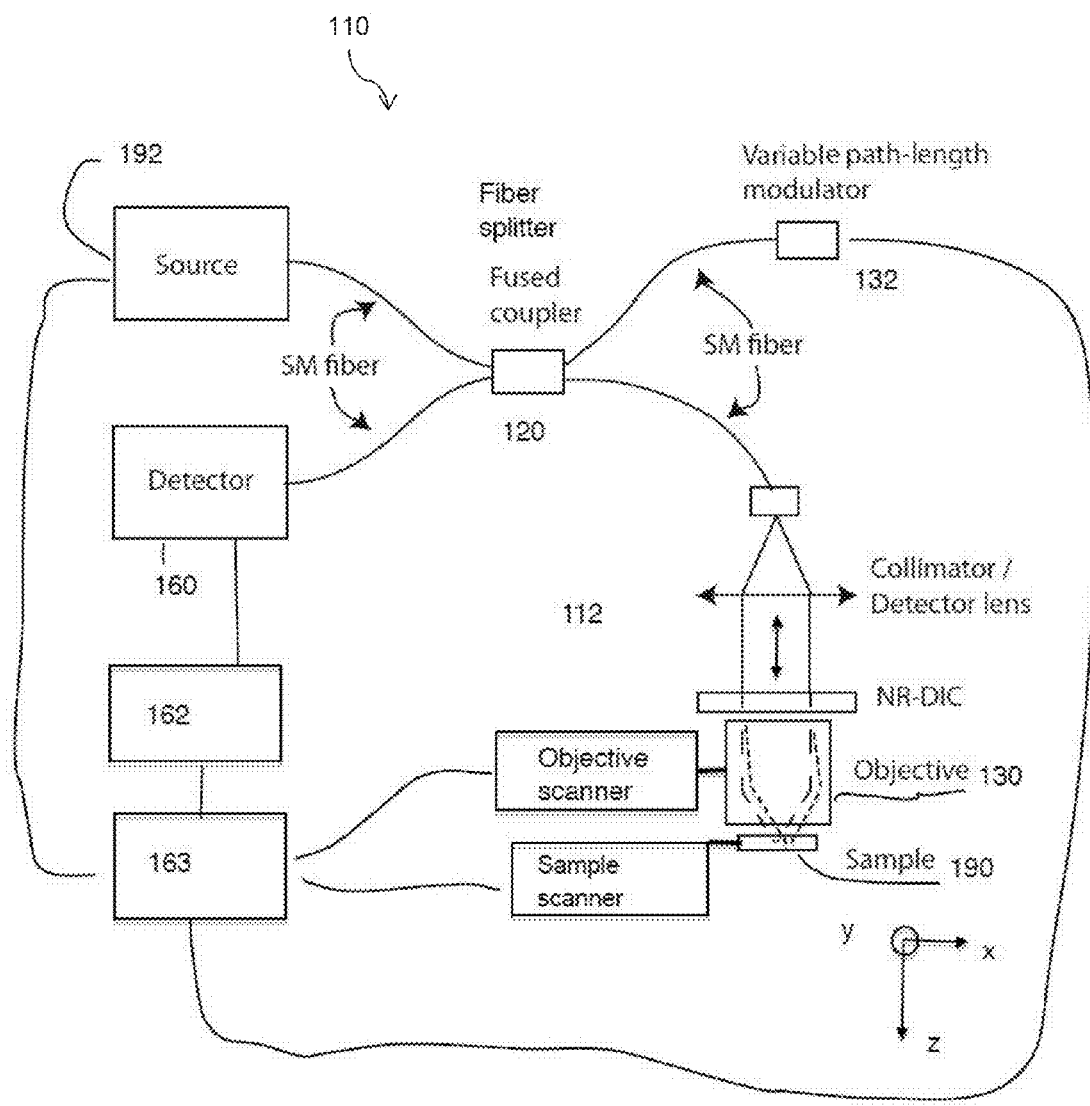
FIG. 9A is a diagram is illustrating the use of NR-DIC within a fiber-based OCT or OCM system, where-in the NR-DIC assembly is only placed in the sample arm.

The improved imaging provided by NR-DIC with telecentric detection can be incorporated both in scanning spot or scanned object OCT or OCM as well as full-field OCM systems. FIG. 9A illustrates a schematic of a scanning spot/scanned object OCT or OCM system utilizing a single spatial mode illuminator in the object arm. Illumination can be provided by a broad-band superluminescent diode, femto-second laser, super continuum source or swept wavelength source coupled into optical fiber. Preferably the optical fiber is a single mode fiber. Photonic crystal fiber may be used as well. Light from the source 192 is divided into an object arm 112 and reference arm 132 by a fiber based splitter 120. Illumination directed to object arm 112 leaves the fiber and is collimated by a lens. The collimated light is directed into a NR-DIC system composed of a Nomarski or Wollaston prism followed by a quarter-wave plate placed at either the aperture stop of the objective or at a pupil of the objective. Because these systems use broadband light, the quarter-wave plate used in OCT or OCM systems should be designed for the wavelength range used. The NR-DIC assembly produces two sheared, orthogonally circularly polarized beams that are focused to two sheared beam waists within the sample 190. Light scattered within the tissue is collected by the objective and directed to the collimation lens that now acts as a detection lens, focusing the light into the fiber. To enable the presently disclosed telecentric detection, the focal point of the detection lens is placed at the aperture stop of the objective or at a pupil of the objective. Light from the object arm 112 mixes with light from the reference arm 132 by way of the fiber splitter to enable an interference signal that is detected by a detector 160. Fiber-based or free space polarization rotators or analyzers may be incorporated in the source, object, reference, and detection fibers to enable balanced detection. The specific detector and detection algorithm depends on the type of OCT: time domain, Fourier domain, or swept wavelength source. The detector is interfaced with a processor 162 that extracts the information associated with the object being imaged. The processor 162 may be interfaced to an additional processor 163 that controls the translation of the scanning system of the optical system or tissue as well as providing the necessary control signals to the reference arm and the illumination source. Processor 163 may have the ability to display, store, and/or transmit images.

Figure 9B:
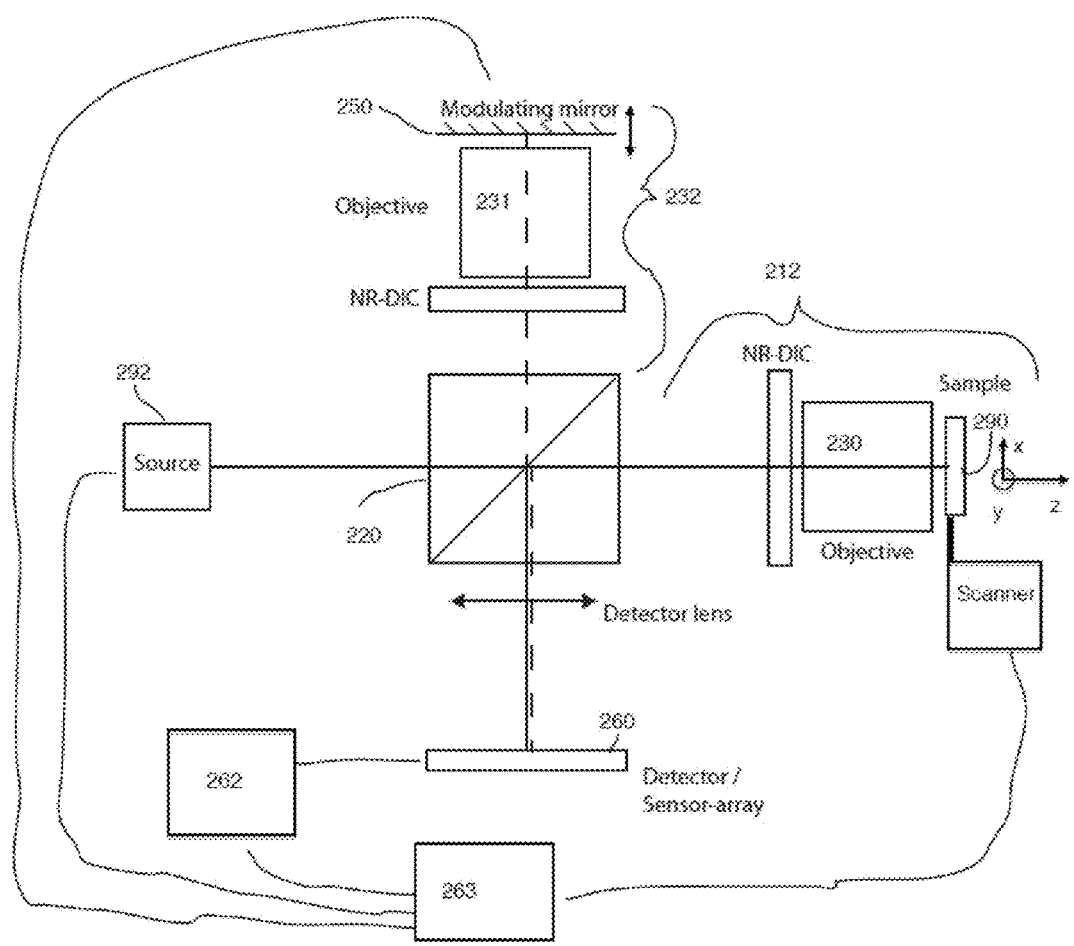
FIG. 9B is a diagram illustrating the use of NR-DIC within a Michelson or Linnik configuration of an OCT or OCM system where-in the NR-DIC assembly is placed in both sample and reference arms.

FIG. 9B illustrates an embodiment of a full-field optical coherence microscope that incorporates the speckle reduction. The optical arrangement follows the geometry of a Linnik interferometer. A source 292, preferably a broad-band area source is directed into a non-polarizing beam splitter 220. Light from the source 292 is split into two arms: a reference arm 232 and an object arm 212. Light directed to the object arm is transmitted through an NR-DIC assembly to produce two sheared, orthogonally circularly polarized fields incident on object 290. The shear prism in the NR-DIC assembly may be placed at the aperture stop of the objective 230 or at a pupil of the object arm. As mentioned above, since this system uses broadband light, the quarter-wave plate used may be designed for the wavelength range used. For each point in the object section being imaged, there are two orthogonally circularly polarized beams that overlap at each object point. In an embodiment, the object section being imaged is located at the rear focal point of the object arm objective 230. Light scattered from each point in the object is collected by the objective 230, passed through the NR-DIC optics, and directed toward an area detector 260 through non-polarizing beam splitter and a detector lens 212.

The optical arrangement of the reference arm is similar to the object arm. Light directed to the reference arm is transmitted through an NR-DIC assembly to produce two sheared, orthogonally circularly polarized fields incident on a reference mirror 250. The shear prism in the NR-DIC assembly may be placed at the aperture stop of the objective 231 or at a pupil of the reference arm. For each point on the reference mirror being imaged, there are two orthogonally circularly polarized beams that overlap at each reference mirror point. In an embodiment, the mirror surface being imaged is located nominally at the rear focal point of the reference arm objective. Light scattered from each point at the reference mirror is collected by the objective 231, passed through the NR-DIC optics, and directed toward an area detector 260 through the non-polarizing beam splitter and detector lens 212. Light from the object arm 212 and the reference arm 232 are mixed by the beamsplitter 220 to enable an interference signal that is detected by a detector 260. A linear polarization analyzer may be placed in the detection arm and the azimuth of the analyzer adjusted to balance the detection of the object and reference arms. In an embodiment, the detector 260 is placed at the rear focal point of the detector lens. The NR-DIC optics in both the reference arm and object arm are placed at aperture stop of the respective objectives or at a pupil of the objectives. The NR-DIC and objective assemblies of both the object and reference arm are positioned such that the pupils of both the reference and object arms coincide with the front focal point of the detector lens. To extract information associated with object, the reference arm may be phase modulated. In an embodiment, the reference mirror is moved in steps of $\lambda_0/4$ where $\lambda_0$ is the mean wavelength of the illumination spectrum normalized by the detector responsivity. Irradiance from the detector is captured at three or more measurements taken at consecutive mirror motion steps and processed to extract the phase and amplitude of the light scattered from a section located in the front focal point of the object arm objective. The processing follows that of prior art phase extraction (J. C. Wyant, Computerized interferometric measurement of surface microstructure, SPIE Proceedings vol. 2576, pgs 122-130 (1996)). The detector is interfaced with a processor 262 that extracts the information associated with the object being imaged. The processor 262 may be interfaced to an additional processor 263 that controls the translation of the optical system to select the depth of imaging (z) within the tissue or the specific (x,y) location of the tissue as well as providing the necessary control signals to the reference arm mirror translator and the illumination source. Processor 263 may have the ability to display, store, and/or transmit images.

In some embodiments, the detector 260 is an area detector such as a CMOS or CCD imaging array. Alternatively, a linear CMOS or CCD imaging array could be used and the linear array could be optically or mechanically scanned to create a two dimensional image.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. An apparatus for imaging a section of a medium which receives and returns light from the section and from sites adjacent to the section, the apparatus comprising:
    an optical system for directing light in beams of different polarization in the medium along an optical axis and returning light from the medium, the optical system comprising:
        a pinhole lens assembly configured to receive the returned light, the pinhole lens assembly having a focal length, and wherein the focal length is configured such that a first focal point of the pinhole lens assembly is located substantially at a pupil of the optical system such that the pinhole assembly is telecentric; and
        a detector configured to receive the returned light from the pinhole lens assembly and produce an electrical signal in response to the received light.

2. The apparatus of claim 1, further comprising a processor in communication with the detector and configured to generate an image of the section based on the electrical signal of the detector.

3. The apparatus of claim 1, wherein the electrical signal of the detector is configured to correspond to a polarization parameter of the received light.

4. The apparatus of claim 3, wherein the polarization parameter is a function of a differential circular dichroism or optical activity of the returned light.

5. The apparatus of claim 3, wherein the polarization parameter is a degree of rotation of the polarization of the returned light.

6. The apparatus of claim 1, wherein the beams overlap in the medium to reduce a portion of the light returned from the sites adjacent to the section that are spaced generally along the optical axis.

7. The apparatus of claim 1, wherein the beams are incident in the medium at spots spaced from each other along the optical axis.

8. A method of imaging a section of a medium which receives and returns light from the section and from sites adjacent to the section, the method comprising the steps of:
    directing light in beams of different polarization to the medium along an optical axis;
    directing light returned from the medium to a detector by way of a pinhole assembly;
    causing the returned light to be substantially telecentric at the detector;
    detecting, at the detector, the returned light; and
    generating an image of the section from the detected light, the image generated in response to a polarization parameter of the returned light.

9. The method of claim 8, wherein the beams overlap in the medium to reduce a portion of the light returned from the sites adjacent to the section which are spaced generally along the optical axis.

10. The method of claim 8, wherein the beams are incident in the medium at spots spaced from each other along the optical axis.

11. The method of claim 8, wherein the polarization parameter is a degree of rotation of the polarization of the returned light.

12. The method of claim 8, wherein said polarization parameter is a function of a differential circular dichroism or optical activity of the returned light.

* * * * *